United States Patent Office 3,354,040
Patented Nov. 21, 1967

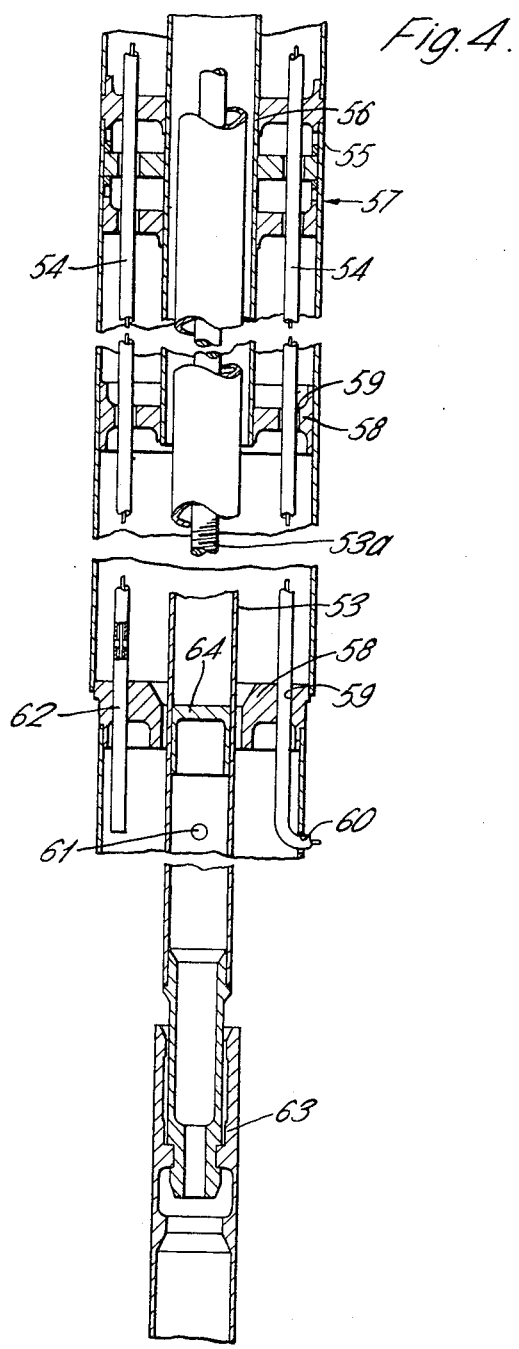

3,354,040
NUCLEAR REACTOR INSTRUMENTATION AND SERVICING ARRANGEMENT
Alexander Gilchrist Frame, Wilmslow, and Horace Frank Parker, Culcheth, Warrington, England, assignors to United Kingdom Atomic Energy Authority, London, England
Filed Aug. 25, 1965, Ser. No. 482,388
Claims priority, application Great Britain, Aug. 28, 1964, 35,459/64
3 Claims. (Cl. 176—19)

ABSTRACT OF THE DISCLOSURE

Instrumentation including thermocouples for the core of a fast nuclear reactor is carried by instrumentation columns projecting downwardly from a rotary top shield. By means of these columns the instrumentation is situated at the outlets of the coolant flow channels of the reactor core. A clear path extends in a radial direction between the instrumentation columns to allow a fuel handling means to gain access to fuel in the coolant flow channels. In conjunction with rotation of the top shield any core position is accessible.

Figure 1:
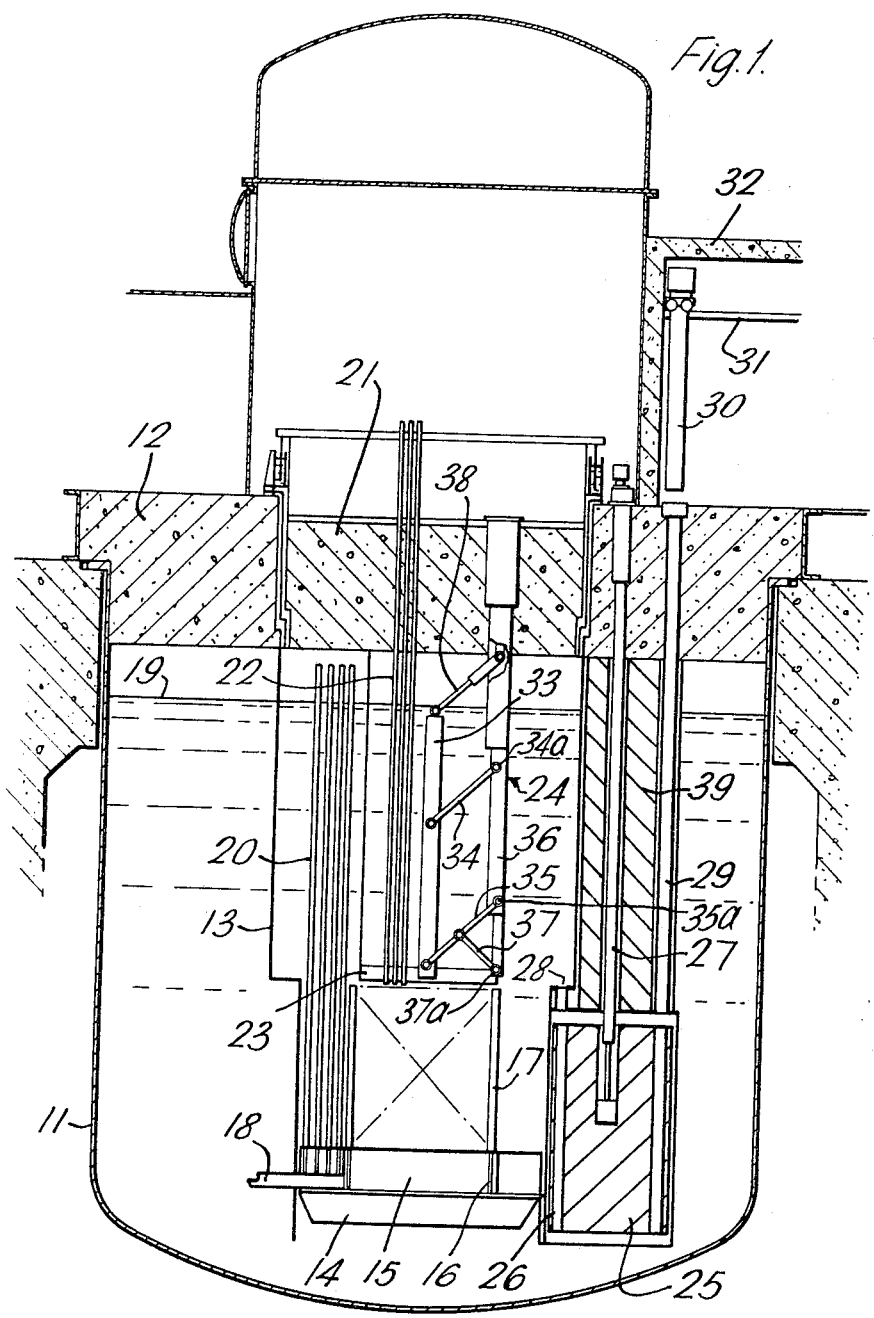

This invention relates to nuclear reactors and is especially although not exclusively applicable to so-called fast reactors.

It is necessary that the operating conditions in a nuclear reactor core are kept under surveillance. This entails instrumentation by which symptoms of defects arising in operation are detectable. For example, temperature measuring instruments are used to give warning of overheating which may be attributable to blockages preventing adequate coolant flow, acoustic detectors may be used to sense the formation of bubbles, as by boiling, in a liquid coolant, and coolant sampling apparatus may be used for detecting the presence in the coolant of fission products indicative of burst fuel element sheathing. Information as to the part of the core from which the defect symptoms originate is also desirable and where the core has fuelled coolant flow channels numerous separate sets of instruments may be provided to monitor the channels individually or in groups. The nearer one approaches the provision of a complete instrument set for each channel, the more difficult becomes the problem of accommodation having regard to all the other equipment which demands access to the core such as refuelling machines and reactivity control means. One concern of the invention is to allow for a large amount of instrumentation without unduly complicating the performance of refuelling operations.

According to the invention a nuclear reactor comprises a vessel, support structure inside the vessel to support a core having fuelled coolant flow channels with their outlets at one end of the core, carrier structure spaced from the aforementioned end and displaceable as a single mass relative to the vessel and instrumentation columns bearing instrumentation and mounted on the carrier structure, these columns being in a clustered arrangement by which the instrumentation is registrable with respective coolant channel outlets whilst being free for displacement with the carrier structure. The column extremities may be actually engaged with the channels of the core during operation of the reactor and in this case it is implied that they are freely disengageable. In this event, and especially if the columns actually project into the channels during operation, provision would be made for the carrier structure to be displaceable towards and away from the channel outlets as necessary for moving the columns clear, this form of displacement being additional to any other which is needed to facilitate refuelling. It is contemplated that access for the handling of fuel is from the channel outlet end of the core, this being the top for a core which is upright. A displacement of the carrier structure laterally of the core could be used to render the channel outlets accessible to the refuelling machine; for example the carrier structure could be a rotary shield with such a degree of eccentricity relative to the core as to enable the column cluster to be positioned by rotation of the shield either over or to one side of the core.

For the saving of space which lateral displacement requires, the preferred arrangement is that the carrier is displaceable by rotation about the axis of the core. With such an arrangement the access for fuel handling may be afforded by removable plugs in the carrier structure, there being one such plug at each of the radii from the core axis at which fuel is loaded into the core. The allocation of only one plug per radius means that the number of plugs is only a small proportion of the total number of fuel loading positions and it may be feasible for the instrumentation columns to be omitted where the plugs are situated; otherwise such columns are either removable with the plug or mounted on the main body of the carrier structure in a manner enabling displacement clear of the plug position.

The instrumentation columns may have hollow interiors for auxiliary mechanical equipment; in particular they may be incorporated in control rod operating mechanisms. In this event the instrumentation columns are constituted by the control rod operating mechanisms having instrumentation leads and instrumentation carried thereby separately from the moving parts.

Particularly in a fast reactor where the fuel is operated with a high heat rating it is usual for the fuel to be stored temporarily after withdrawal from the core in some suitable storage facility inside the reactor vessel so as to allow for a reduction of the heating rate by the decay of retained fission products before the fuel is actually taken out of the vessel. For this purpose a shifting of the fuel laterally of the core is appropriate. Therefore, in a more specific form of the invention built around this requirement, there is provided a nuclear reactor comprising a vessel, a core having fuelled coolant flow channels with their outlets at one end of the core, structure for supporting the core within the vessel, carrier structure spaced from the aforementioned end and rotatable as a single mass about an axis substantially coincident with that of the core, instrumentation columns bearing instrumentation and mounted on the carrier structure to project therefrom towards the aforementioned end of the core and register the instrumentation with respective coolant channel outlets in one angular position of the carrier structure, and a fuel handling means, the arrangement of the instrumentation columns being such as to permit a radial clear path between the columns for traversing the fuel handling means into registry with any radial position and rotation of the carrier structure permitting the fuel handling means to be brought into registry with any angular position. Conveniently the fuel handling means is carried by the carrier structure although a separate form of support movable independently about the carrier structure axis could be provided should this be warranted by the desirability of being able to move the fuel handling means without the carrier structure and instrumentation columns, for example, when executing the final step of depositing the fuel in the temporary storage facility.

Figure 2:
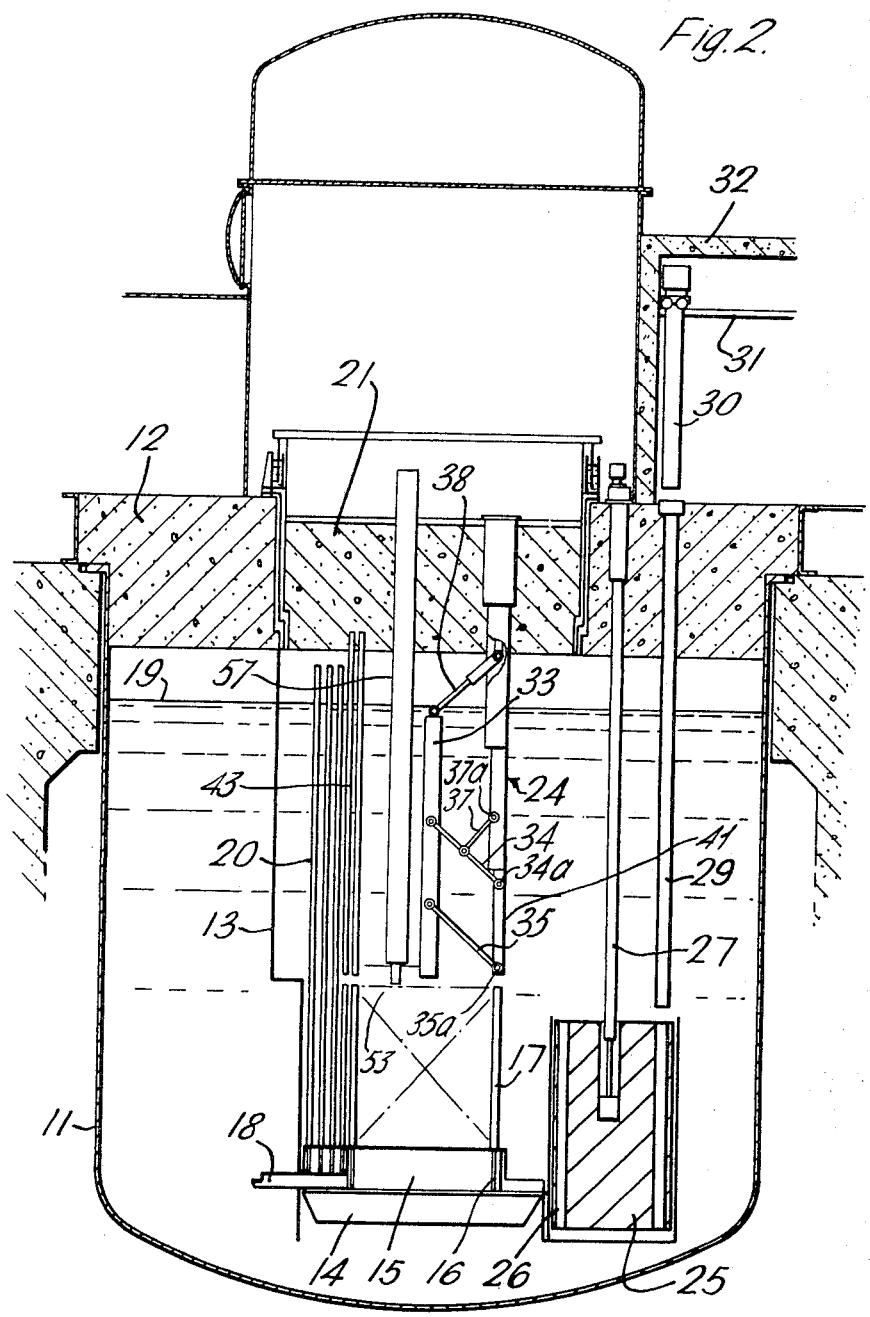
Figure 3:
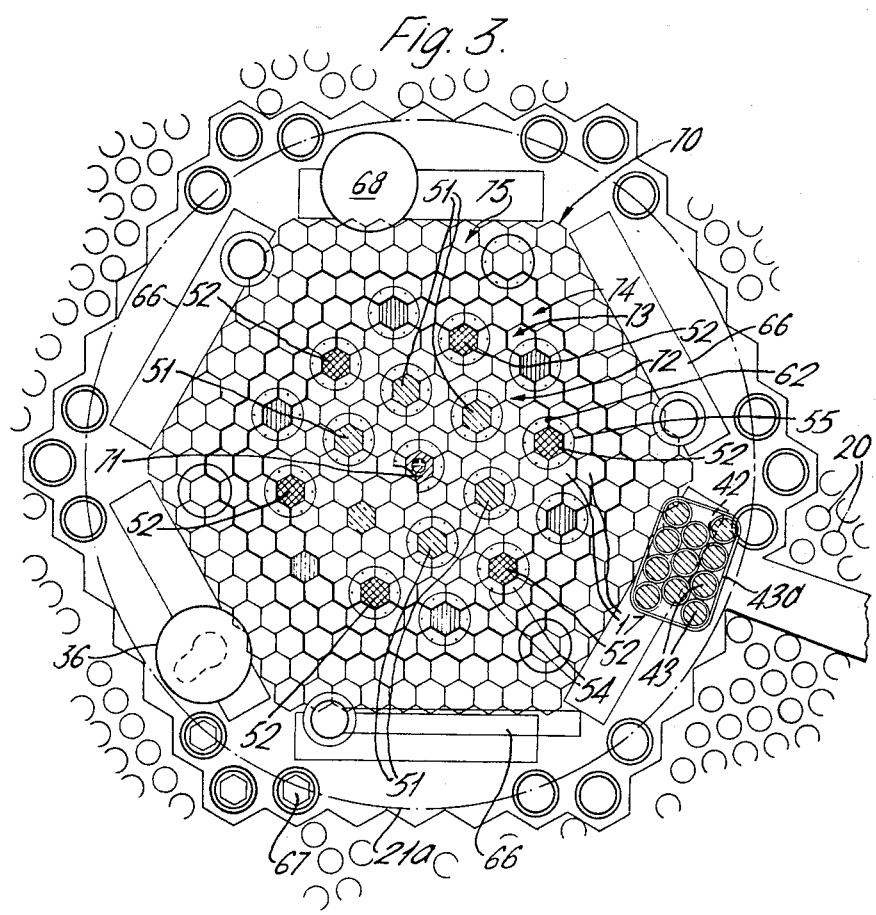

Two embodiments of the invention will now be described to illustrate the basic invention and several variants thereof with reference to the accompanying drawings in which FIGURE 1 is a diagrammatic section through a liquid metal cooled fast reactor, FIGURE 2 is a diagrammatic section through a second liquid metal cooled fast reactor, FIGURE 3 is a diagrammatic plan view of the core of FIGURE 2 and FIGURE 4 is an elevational section of a lower part of a control rod operating mechanism which also serves as an instrumentation column.

In these drawings like parts have the same reference numerals.

A reactor vessel 11, which is to be understood to be double-walled, is dependently supported in a vault and has a top closure 12 constructed to serve as biological shielding. Supported dependently from the top closure so as to be disposed centrally in the vessel is a core support skirt 13 having at its lower end a combined support grid and coolant inlet header structure 14; into an inlet header box 15 of this structure project apertured hollow spikes, such as 16, of fuel element assemblies 17 constituting the core of the reactor. Each assembly 17 is composed of a hexagonal casing or wrapper defining a coolant flow channel in which are carried a large number of fuel pins spaced from one another to allow the coolant to pass between them. The assemblies in the core are vertical and packed closely together; the top ends are open so that coolant pumped into the inlet header box through several inlet pipes, such as the one denoted 18, enters the assemblies through the spikes 16, flows upwardly over the fuel pins, leaves the assemblies through the top ends acting as outlets and is conducted through several pipes (not shown), which penetrate the skirt 13 at the enlarged portion above the core, to primary heat exchangers. For simplicity of illustration, these heat exchangers, and likewise the pumps, are not shown in the drawing, but they should be understood to be disposed in the annular space between the skirt 13 and the walls of the reactor vessel. After heat exchange to coolant in a secondary circuit the core coolant is discharged from the primary heat exchangers directly to the interior of the reactor vessel; therefore in the vessel there is a reservoir of coolant up to the level indicated 19 and in this reservoir are submerged the primary heat exchangers and the pumps, the latter being arranged to draw from the reservoir.

Neutron shielding around the core, by which activation of components like the primary heat exchangers and pumps is kept to a requisite low level, is constituted by elongated shielding elements 20 of steel-clad borated graphite which are supported by the fitting of spikes at their bottom ends in the grid structure 14 so that between the core and the skirt there are several rings of these elements extending almost to the inner face of the top closure 12, the elements of adjacent rings being staggered so as to eliminate straight line paths in the gaps which remain. Through these gaps, however, the outlet coolant from the core has to flow in order to reach the outlet piping leading to the primary heat exchangers.

Inside the skirt 13 the top closure 12 takes the form of a rotary shield 21 which acts as a carrier structure for instrumentation columns of which some are shown at 22. There is one such column for every fuel element assembly in the core; the columns are for the most part cylindrical and extend through the rotary shield down to a level just above the outlet ends of the assemblies in a parallel relationship which produces a densely clustered arrangement. At the bottom, this clustered arrangement is steadied against lateral deflection by a cage structure 23 which is suspended from the rotary shield. Thermal expansion movements occurring with the illustrated forms of support will tend to bring the columns and the fuel element assemblies closer together at their adjacent ends as the reactor is brought up to normal operating power from the cold condition and the installation of the columns should make allowance for this. At normal operating power, a gap between the columns and the assemblies of up to about one inch should prove acceptable for ensuring that rotation of the rotary shield remains unobstructed by the columns whilst affording sufficient confidence that measurements derived from instrumentation in the columns are specific to the respectively associated assembly.

The column instrumentation is of a kind appropriate to the measurement of coolant conditions: thermocouples for the measurement of coolant outlet temperature from the fuel element assemblies are included in the illustrated embodiment, their cables being carried through the length of the columns to the exterior of the reactor vessel. Sampling pipes for a fission product detection apparatus are another example of the equipment which can be installed in these columns. The columns may be hollow and open-ended over a lower length and be so constructed that a stream of coolant is diverted through the hollow interior; the sampling pipes conveniently open into these internal streams. The columns may also be used for carrying down to the fuel element assemblies a means for operating gag valves in the event that such valves are included in the fuel element assemblies. In this way the possibility of regulating such valves in situ at all times is available. Assuming that the operating means takes the simple form of a rotatable rod passing down the length of each column, this rod can be subject to a spring bias tending to keep the rod clear of the respectively associated assembly for maintaining freedom from obstruction against rotation of the rotary shield; in this case the gag valves would be self-locking and regulation would be carried out by depression of the appropriate rod, against the spring bias, into driving engagement with the selected valve. It will be appreciated that the columns therefore afford a facility into which can be consolidated a wide variety of auxiliary equipment.

A fuel handling means penetrating, and suspended from the rotary shield 21 is indicated generally at 24; this means is a mechanism by which to transfer fuel element assemblies singly from the core to a temporary storage facility in the form of a rotary magazine 25 having a ring of storage holes, such as 26. This magazine is suspended by its drive shaft 27 from the top closure 12 in such a position outside the skirt 13 that the storage holes are registrable by rotation of the magazine with a transfer port 28 passing through the step which is formed in the skirt where the diameter is enlarged above the core. Also registrable with the storage holes, but diametrically opposed to the transfer port 28, is a discharge chute 29 through which fuel element assemblies can be withdrawn from the magazine to a flask 30 borne on rails 31 in a concrete cave 32 outside the reactor vessel.

The transfer mechanism 24 comprises a lift tube 33 supported by links 34 and 35 of a parallel linkage from a vertical pillar 36. On this pillar it is to be understood that the pivots of these links, as also the pivot of a positioning link 37, are mounted in a manner enabling remotely controlled adjustment of their positions lengthwise of the pillar such that the lift tube can be traversed parallel to the pillar and at the same height above the core between a position aligned with the centre of the core and a position folded back into the pillar. In the latter position, the transfer mechanism is removed through the rotary shield 21 when not in use. Within the lift tube is a grab which is lifted and lowered by a drive transmission passing through a telescopic link 38, the grab being operable to grasp a fuel element assembly at the lower end of its travel and to lift the element up into the lift tube.

To enable introduction and operation of the transfer mechanism 24, a radial path has to be cleared through the clustered instrumentation columns 22; those which are in this path may be set to either side of the path where they pass through the shield 21 and be either articulated or allowed to flex so that for normal operation of the reactor they can be brought into registration with the respective fuel element assemblies. When thus registered it follows that these particular columns will be subject to some slight departure from the parallel relationship previously specified. Remotely operable linkage is necessary for the displacement of these columns and support for such linkage can be found on the cage structure 23; the latter is of course constructed to leave the radial path clear. Although the present example utilises a linearly traversable transfer mechanism, the traverse could of course be arcuate, as by means of a swinging arm, and then the clear path would extend arcuately from the centre of the column cluster to the periphery.

A continuation of the clear path through the shielding elements 20 to the transfer port 28 is kept permanently clear by the omission of shielding elements 20 in this path. As a substitute there is shielding 39 disposed externally of the skirt 13 in this region. Alternatively, it can be arranged that shielding elements positioned in this path in normal operation are withdrawable into a flask above the rotary shield during fuel handling operations.

The only other obstruction to fuel handling operations are any control elements which may be inserted in the core. Such elements, although not appearing in the FIG. 1, are to be understood to contain neutron absorber effective in the fast flux of the reactor under consideration and to be insertable into the core from above, the requisite drives being carried by the rotary shield 21. The control elements are disconnectable from the respective drives so that fully inserted elements necessary for maintaining the shutdown condition of the reactor which prevails for fuel handling operations are allowed to remain inserted by disconnection. Any others are retracted fully into the rotary shield.

From the preceding description it will be appreciated that the preparations for fuel handling create a situation in which the rotary shield 21 can be rotated and the transfer mechanism 24 traversed. By these movements the lift tube 33 is alignable with any fuel element assembly 17 in the core. Briefly, the sequence of operations in transferring an assembly to the magazine 25 is as follows: the element assembly is lifted fully into the lift tube by the grab, the rotary shield is rotated as necessary to bring the path cleared through the column cluster into line with that cleared through the shielding elements 20, the lift tube 33 is folded back into the pillar 36, possibly concurrently with the previous step, the pillar is rotated through a half-circle, the lift tube is traversed into registration with the discharge port 28, and finally the grab in the lift tube is lowered to deposit the fuel element assembly into a storage hole 26 of the magazine. If the magazine has been charged with replacement assemblies, the transfer mechanism can return to the core taking such a replacement assembly at the same time.

The embodiment of FIGURE 1 differs from that of FIGURES 2, 3 and 4 in respect of the transfer mechanism, the shielding and the instrumentation columns. In the transfer mechanism 24 in the embodiments of FIGURE 1 or FIGURE 2 the links 34, 35 and 37 are pivoted to the pillar in a manner enabling remotely controlled adjustment of the respective positions of the pivots 34a, 35a and 37a along the pillar so that the lift tube 33 can be traversed horizontally. This is done by providing two modes of remotely controlled adjustment, one to open or close the parallel motion linkage by moving the pivot 37a between the positioning link 37 and the pillar with respect to the pivots of the parallel linkage and the second to raise or lower all the pivots so as to correct for any non-horizontal movement of the lift tube. The transfer mechanism of FIGURE 2 differs from that of the first embodiment in that the first mode of adjustment is transmitted to the pivots 34a, 35a of the parallel linkage since it is this linkage which is positioned so as to be under compression by the weight of the lift tube.

In the event of failure, the lift tube will tend to collapse towards the pillar. Whether or not a link is under compression or not is decided by the geometry of the arrangement, in particular whether the pivot position on the pillar is at the highest or lowest part of the link. The two links 34, 35 are pivotted at their lower ends to a carriage 41 which imparts the first mode of remotely controlled adjustment to the pivots 34a, 35a of the parallel linkage; the two links 34, 35 are under compression by the weight of the lift tube 33. The positioning link 37 has its pivot 37a fixed on the pillar and is under tension.

As regards the neutron shielding, it is provided again by the elongate shielding elements 20 of steel clad borated graphite except for the path leading to the transfer part 28. For this path, instead of the shielding 39, a cluster 42 of closely bunched steel clad borated graphite rods 43 is supported in a cage 43a suspended from the rotary shield 21 so that the rotary shield 21 can be parked when not in service with the cluster 42 closing the path from the inside. These rods 43 extend from the rotary shield to a short distance above the reactor core.

FIGURE 3 is in effect a cross-section through the instrumentation columns looking down at the core but also includes a broken line circle 21a representing the periphery of the rotary shield. This figure shows that in cross-section the core consists of a number of annular zones delineated by heavy lines. A central low enrichment fuel zone 70 surrounds a single vacant channel 71, this vacant channel 71 being used during reactor start-up for a neutron producing means or oscillator. In succession the central zone is surrounded by a higher enrichment outer zone 72, a reflector zone 73, a breeder zone 74, a further reflector zone 75 and shielding 76. Apart from the shielding 76 which consists of the rods 20, the other zones constitute the reactor core. FIGURE 3 shows how the number of instrumentation columns can be reduced by using one instrumentation column to serve a number of channels.

Specifically FIGURE 3 shows how instrumentation can be supported in circles at various points over the core, notably around control rod channels 51 and shut down rod channels 52, to project into neighbouring core channels 17; as will be seen from the figure very nearly every channel of the zones 70 and 72 to 74 is instrumented by virtue of an even distribution of the instrumentation supports.

With each of the control and shut down rod channels 51 or 52 there is associated a rod operating mechanism; the rod operating mechanism can be instrumented to serve as an instrumentation column.

In the instrumented control rod operating mechanism of which the lower half is illustrated in FIGURE 4, an extension tube 53 is adapted to be engaged with a control rod 63 and to be raised or lowered by cooperation with a screw member of which the illustrated part 53a is an extension. Instrumentation cables 54 are led down between inner and outer walls of a pillar 57 encircling the extension tube 53 and depending from the rotary shield 21. The outer wall 56 extends to within about six inches from the upper end of the core; this six inches will be reduced to about four inches by thermal expansion when the reactor is hot, but the inner wall need not extend as far. The radial path for the transfer mechanism 24 is provided by using, along that radial path, non-instrumental control rod operating mechanisms which dispense with the walls 55, 56 below the level of the shield 21; the control rod operating mechanism can then be fully retracted either with the control rod or leaving the control rod in the core. To make the radial path long enough to reach the inner row of the control zone 70, the central instrumentation column is recessed as seen in FIGURE 3. The instrumentation cables 54 are supported from the outer wall 56 by internal flanges 58 with suitable guide passages for the cables 54.

Some of these instrumentation cables lead through holes 60 in the outer wall to thermocouples which, as can be seen from FIGURE 3, lie on the axes of the surrounding core channels. Another cable leads to a noise monitor which detects any sound emanating in the neighbourhood of the control rod operating mechanism. It is to be assumed that only one such monitor is installed in each instrumentation column. A further cable may lead to a thermocouple remaining inside the outer wall, onto which thermocouple, the flow through the control rod channel and the hollow interior of the extension tube is directed by a baffle 64 and apertures 61 in the extension tube.

FIGURE 3 also shows three sweep arms 66; these arms are for checking that there is no mechanical connection between the core and the rotary shield prior to rotation of the rotary shield; this checking is done by sweeping the arms across the end of the core. Also illustrated are storage spaces 67 for fuel element subassemblies or control rods and also an access tube 68 which can also serve as an emergency discharge facility.

We claim:

1. A fast nuclear reactor comprising a vessel, a core having fuelled coolant flow channels with their outlets at one end of the core, structure for supporting the core within the vessel, a carrier structure spaced from the aforementioned end and rotatable as a single mass about an axis substantially coincident with that of the core, instrumentation columns bearing instrumentation comprising at least temperature measuring means, said columns being mounted in a parallel arrangement on the carrier structure to project therefrom towards the aforementioned end of the core for registering the instrumentation unattachedly with respective coolant channel outlets in an operating position of the carrier structure, and a fuel handling means for gaining access to fuel in the coolant flow channels through a clear path defined by and extending radially between the instrumentation columns, whereby said clear path in conjunction with the rotational capability of said carrier structure allows access by the fuel handling means to any position in the core.

2. A nuclear reactor according to claim 1 wherein the core is provided with neutron shielding having a gap therethrough for the fuel handling means to transfer fuel from the core to the outside of the core and in which separate shielding provided for that gap is displaceable to enable the gap to be cleared.

3. A nuclear reactor according to claim 2 wherein the separate shielding is mounted on the carrier structure.

References Cited

UNITED STATES PATENTS

| | | | |
|---|---|---|---|
| 3,073,771 | 1/1963 | Moulin | 176—27 |
| 3,169,117 | 2/1965 | Dickinson | 176—40 |
| 3,182,002 | 5/1965 | Laithwaite et al. | 176—40 |
| 3,271,262 | 9/1966 | Hutchinson et al. | 176—30 |

L. DEWAYNE RUTLEDGE, *Primary Examiner.*